(12) United States Patent
Damiani

(10) Patent No.: US 6,487,790 B2
(45) Date of Patent: Dec. 3, 2002

(54) APPARATUS FOR CONTINUOUSLY DRYING UNPACKAGED FOOD PRODUCTS, IN PARTICULAR VEGETABLES

(76) Inventor: Pasquale Damiani, Via Industria, 6/8/10/12, 26020 Agnadello (Cremona) (IT)

( * ) Notice: Subject to any disclaimer, the term of this patent is extended or adjusted under 35 U.S.C. 154(b) by 0 days.

(21) Appl. No.: 09/820,489

(22) Filed: Mar. 29, 2001

(65) Prior Publication Data

US 2002/0139006 A1 Oct. 3, 2002

(51) Int. Cl.⁷ ................................................. F26B 5/16
(52) U.S. Cl. ............................ 34/134; 34/429; 34/430; 34/80; 34/63; 34/131
(58) Field of Search .......................... 34/416, 428, 429, 34/430, 433, 443, 449, 454, 472, 473–477, 83, 84, 72, 79, 80, 62, 63, 130, 131, 134, 138–142, 137, 164, 166, 236, 491–494, 498

(56) References Cited

U.S. PATENT DOCUMENTS

| | | | | |
|---|---|---|---|---|
| 1,330,238 A | * | 2/1920 | Carrier | 34/134 |
| 1,673,600 A | * | 6/1928 | Spencer | 34/27 |
| 3,067,522 A | * | 12/1962 | Teigen | 34/27 |
| 3,203,109 A | * | 8/1965 | Moore | 34/62 |
| 4,291,472 A | * | 9/1981 | Lewis | 34/31 |
| 4,974,337 A | * | 12/1990 | Tavakoli et al. | 34/27 |
| 5,428,904 A | * | 7/1995 | Rutz | 34/219 |
| 5,433,019 A | * | 7/1995 | Fu et al. | 34/381 |
| 6,079,118 A | * | 6/2000 | Kiyokawa | 34/134 |
| 6,094,835 A | * | 8/2000 | Cromer | 34/80 |
| 6,289,606 B2 | * | 9/2001 | Gillette et al. | 34/472 |

* cited by examiner

Primary Examiner—Ira S. Lazarus
Assistant Examiner—K. B. Rinehart
(74) Attorney, Agent, or Firm—Hedman & Costigan, P.C.

(57) ABSTRACT

An apparatus for continuously drying unpackaged food products, in particular vegetables, comprises conveyor means for conveying the products to be dried and circulating means for feeding dry air on the product to be dried and for collecting wet air coming from the products, and being characterized in that the apparatus further comprises means for dehumidifying the wet air, said means comprising an adsorption dehumidifier device.

6 Claims, 5 Drawing Sheets

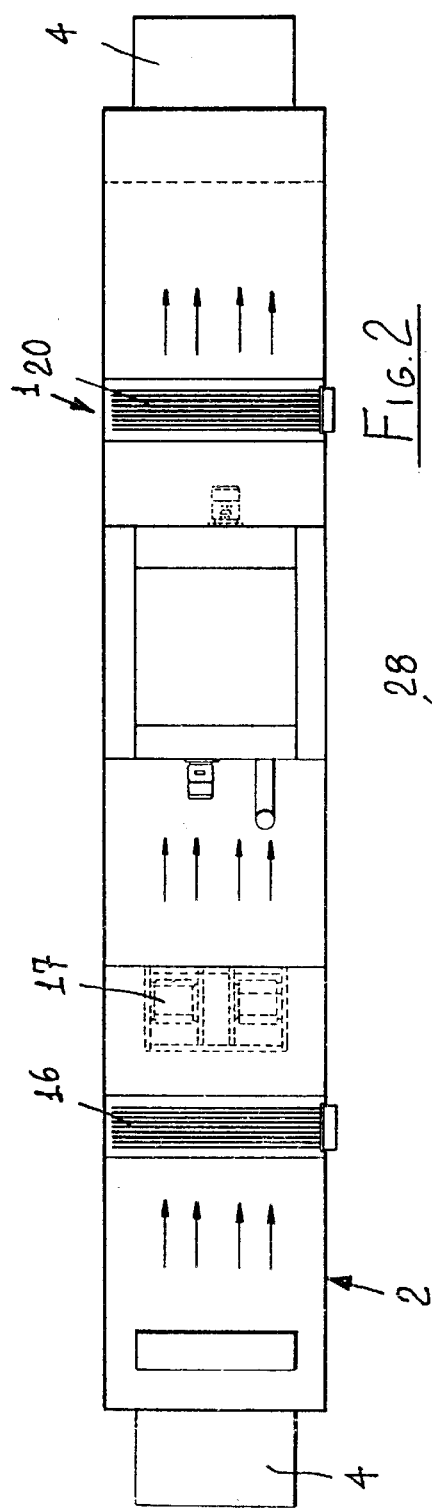
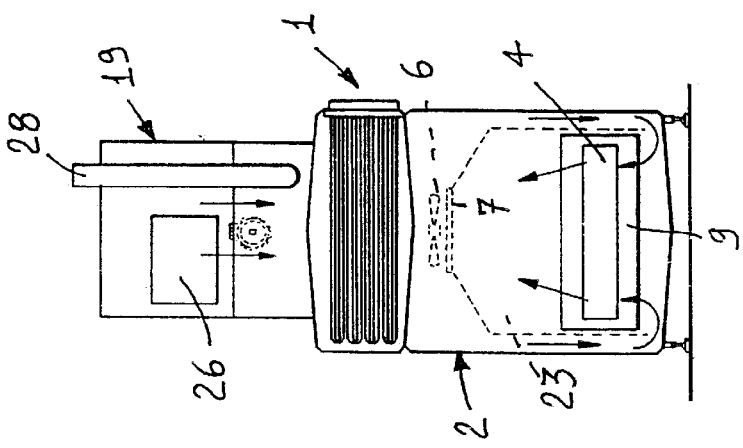
Fig. 2
Fig. 3

APPARATUS FOR CONTINUOUSLY DRYING UNPACKAGED FOOD PRODUCTS, IN PARTICULAR VEGETABLES

BACKGROUND OF THE INVENTION

The present invention relates to an apparatus for continuously drying unpackaged food products, and vegetables in general.

As is known, in conventional food product drying apparatus, the air coming from the products to be dried is conveyed through a tunnel, after heating and cooling thereof.

In order to prevent the food products from being damaged, and to further prevent the organoleptic characteristics of said products from being negatively affected, it is necessary to dry the products by air having a comparatively low temperature.

However, conventional food product drying apparatus have not been found satisfactory in properly drying the food products because they usually operate at a comparatively high temperature, thereby damaging the food products.

On the other hand, if the temperature of a conventional drying system is held at a comparatively low value, then the vegetables cannot be quickly dried because of the high moisture of the drying air, which is recycled several times and which, for each cycle, increases in its moisture contents.

SUMMARY OF THE INVENTION

Accordingly, the aim of the present invention is to provide such an apparatus for continuously drying unpackaged food products and vegetables, which overcomes the above mentioned drawbacks of prior drying apparatus.

Within the scope of the above mentioned aim, a main object of the present invention is to provide such an apparatus for continuously drying unpackaged food products which is adapted to perfectly dry the products, by using a low temperature drying air.

Another object of the present invention is to, provide such a drying apparatus which is very reliable in operation and can be easily managed and controlled.

According to one aspect of the present invention, the above mentioned aim and objects, as well as yet other objects, which will become more apparent hereinafter, are achieved by an apparatus for continuously drying unpackaged food products and vegetables, comprising conveyor means for conveying the food products to be dried, drying air circulating means for conveying dry air on the food products to be dried, and being characterized in that said apparatus further comprises dehumidifying means for dehumidifying moist air, said dehumidifying means comprising an adsorption dehumidifying device.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example, in the accompanying drawings, where:

FIG. 2 is a top plan view of the drying apparatus for continuously drying fresh vegetables and unpackaged food products;

FIG. 3 is a front elevation view of the continuously drying apparatus according to the present invention;

DESCRIPTION OF THE PREFERRED EMBODIMENTS

Figure 1:
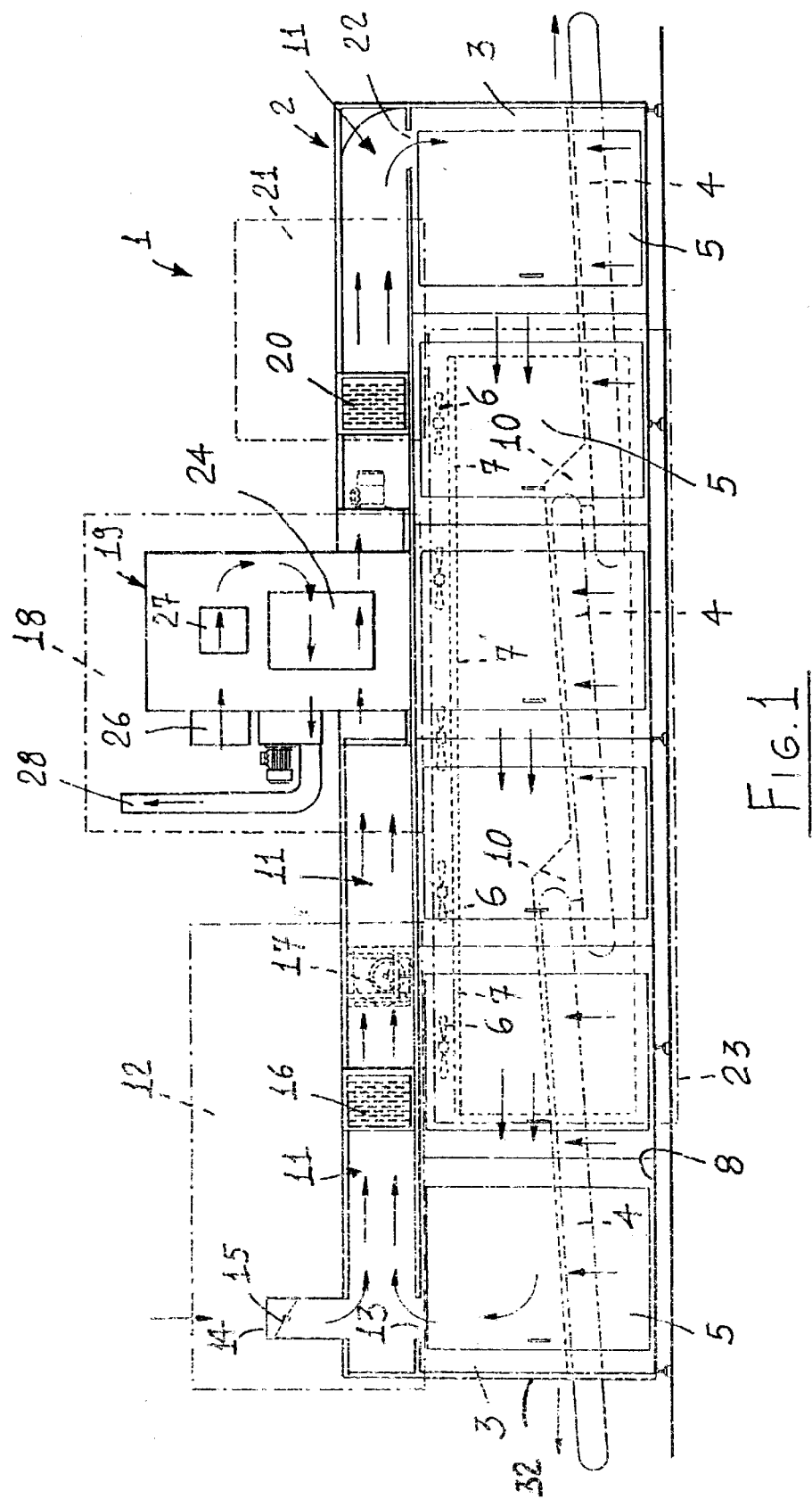
FIG. 1 is a side elevation view of the continuously drying apparatus according to the present invention.
Figure 4:
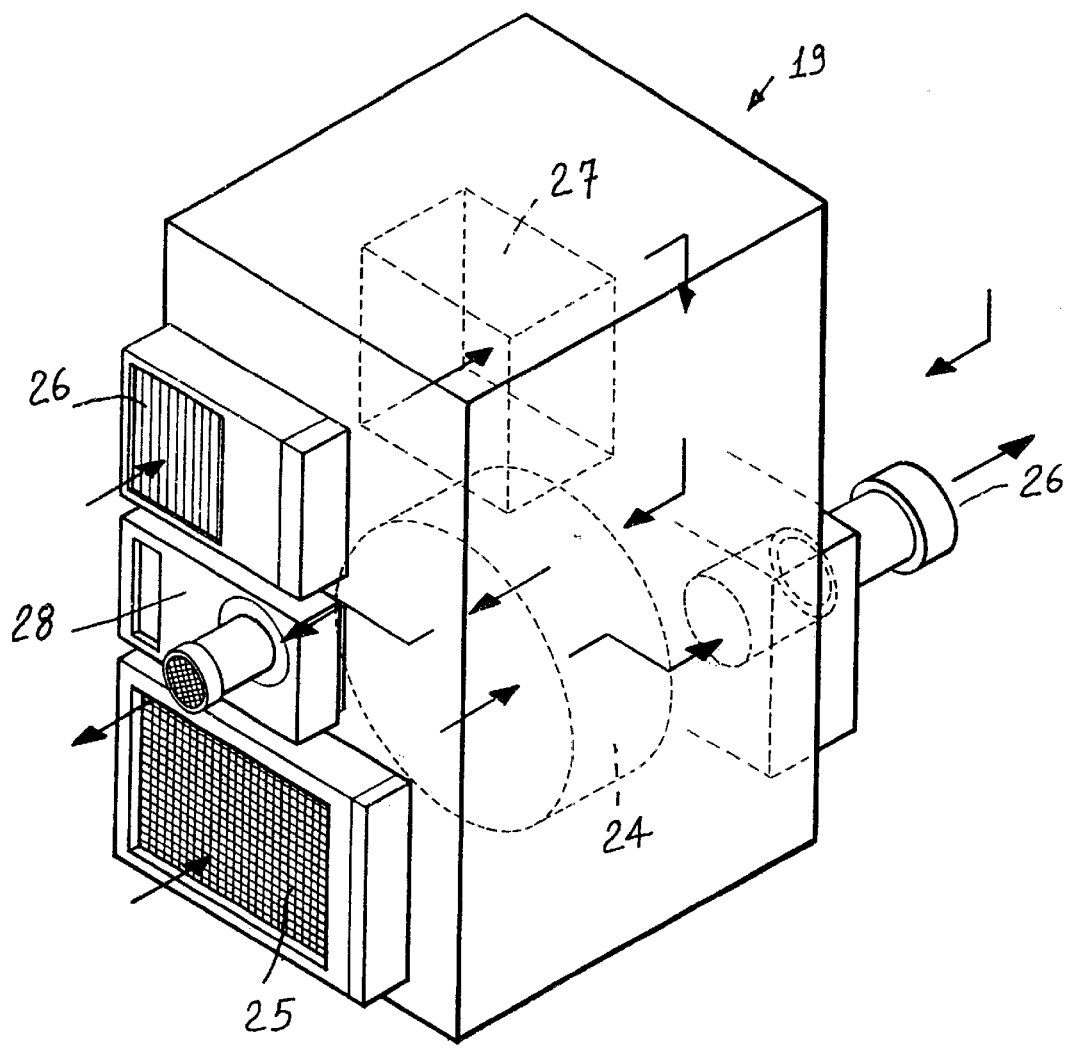
FIG. 4 is a schematic perspective view of a dehumidifying device, applied to the subject apparatus.

With reference to the number references of the figures of the accompanying drawings, the apparatus for continuously drying food products and vegetables, according to the present invention, which has been generally indicated by the reference number 1, comprises a box-like body 2, defining a drying tunnel 3, therealong is conveyed a food product to be dried, by conveying means comprising, in the disclosed embodiment, a plurality of conveyor belts 4.

The first conveyor belt comprises an outer loading portion for loading thereon the product to be dried, which portion projects from said tunnel through an inlet opening 9 formed through the box-like body.

The last conveyor belt also projects outside the mentioned box-like body through a like outlet opening.

Inside said tunnel 3, which can be visually controlled through inspection ports 5 formed through the box-like body 2, are provided a plurality of fans 6 and a thermal exchange battery 7, defining a condensing region 23.

On the bottom of said tunnel are provided a plurality of trays 8 for collecting therein water coming from the food product, which, during its conveying through the tunnel, is protected by protective nets 10.

As shown, the mentioned box-like body 2 is provided, on the top of said tunnel 3, with a channel 11 for conveying air therethrough.

At a first region 12 thereof, the channel 11 is coupled to a moist air ejection opening 13, for ejecting moist air coming from the tunnel 3 and with an air port 14, controlled by a controlling late 15, for taking air from the outside environment.

By operating ventilating means 17, the air is sent to a first cooling battery 16 and then to a second region 18 including a dehumidifying device for dehumidifying the air, said dehumidifying device being advantageously an adsorption type of dehumidifying device 19.

More specifically, the dehumidifying device 19 provides dehumidified air which is sent to a third region 21, where it passes through a second cooling battery 20 and being then again supplied to the tunnel 3 through an air inlet opening 22, arranged near the food product outlet.

The adsorption dehumidifying device 19, in the illustrated embodiment, is of a rotary type and comprises, as the main elements thereof, a rotary drum 24 which holds therein a hygroscopic material.

Said drum receives moist air from the air inlet 25 and sends dehumidified air to the air outlet 26.

The regeneration of the hygroscopic material is performed in the regeneration region, comprising an environment air inlet 26, receiving air from a heater 27 and from the moist air outlet 28.

The dehumidifying device is also designed for performing, in addition to the dehumidifying of air, also a sterilization thereof.

In operation, the food product is continuously conveyed through the tunnel, from the left to the right thereof, as shown in FIG. 1, by conveyor means, and is subjected to the action of the dry air circulating through the tunnel.

By such a processing, the water included in the food product is adsorbed by the dry air, the moisture of which continuously increases and being discharged from the ejecting opening 13, from the food product inlet side, and being replaced by refrigerated air at the product outlet side, by passing through the regions 12, 18 and 21, respectively.

The moist air, ejected from the ejecting opening 13, and which has a temperature from 10° C. to 30° C., is mixed with a portion of fresh cooled air, at a temperature of about 2° C.÷10° C., passing through the first cooling battery 16 at the region 12.

Then, the air passes through the adsorption dehumidifying device 19, where its moisture contents are reduced, and then passes through the second cooling battery 20, which brings said air to a preset temperature, preferably from 2° C. to 15° C.

Then, the adjusted temperature dry air is supplied to the tunnel, through the air inlet opening 22, at the food product outlet side, thereby causing said air to circulate in a direction opposite to the feeding direction of the product to be dried.

The thermal exchange battery, which can be either a steam, hot water or other heater element exchange battery 7, in cooperation with the fans 6, operates to slightly increase the air temperature up to about 30° C., so as to facilitate the condensation of the moisture and recirculation of air to the region 23.

Figure 5:
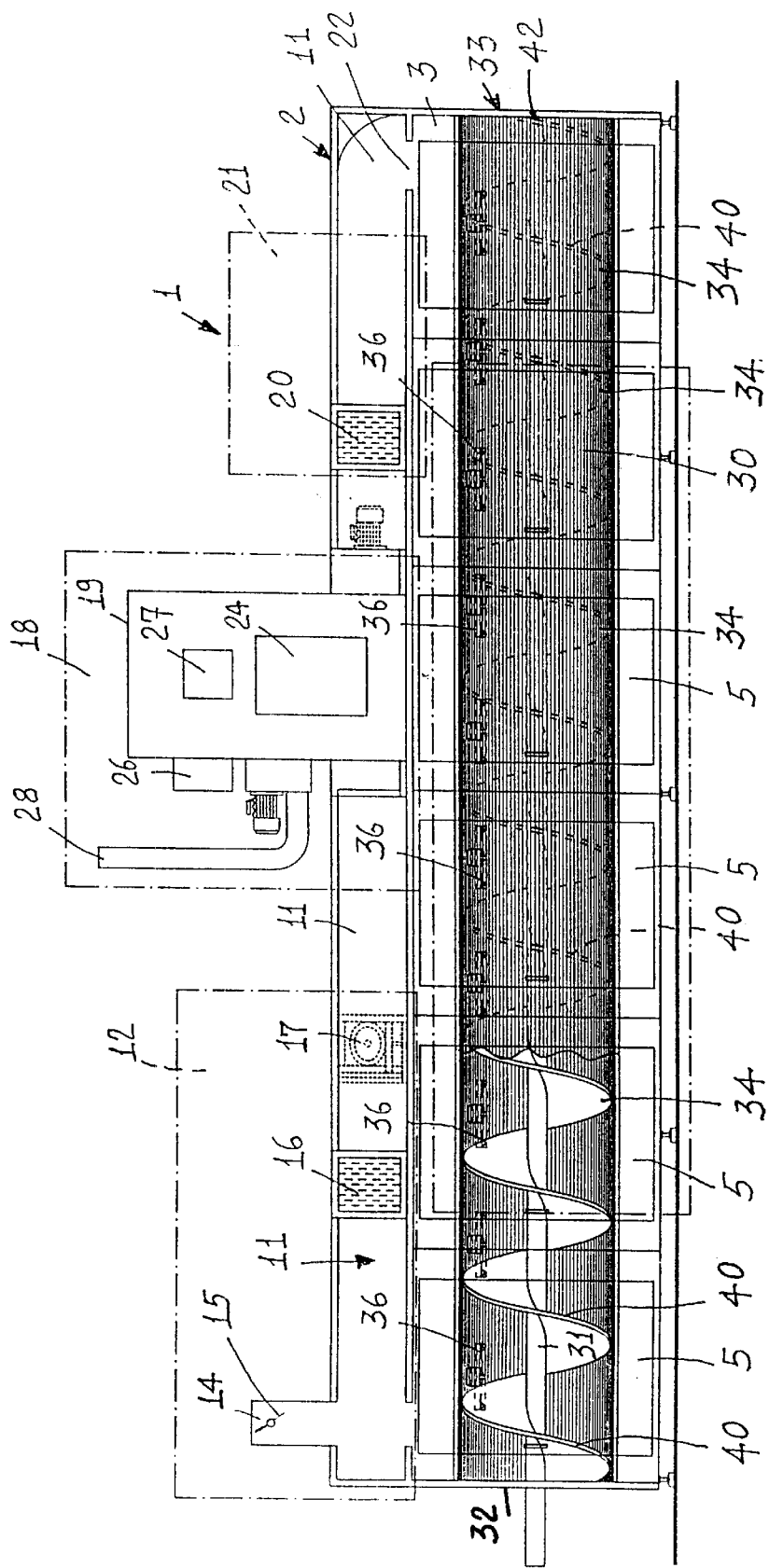
FIG. 5 is a side cross-sectioned view of a modified embodiment of the system shown in FIG. 1.
Figure 6:
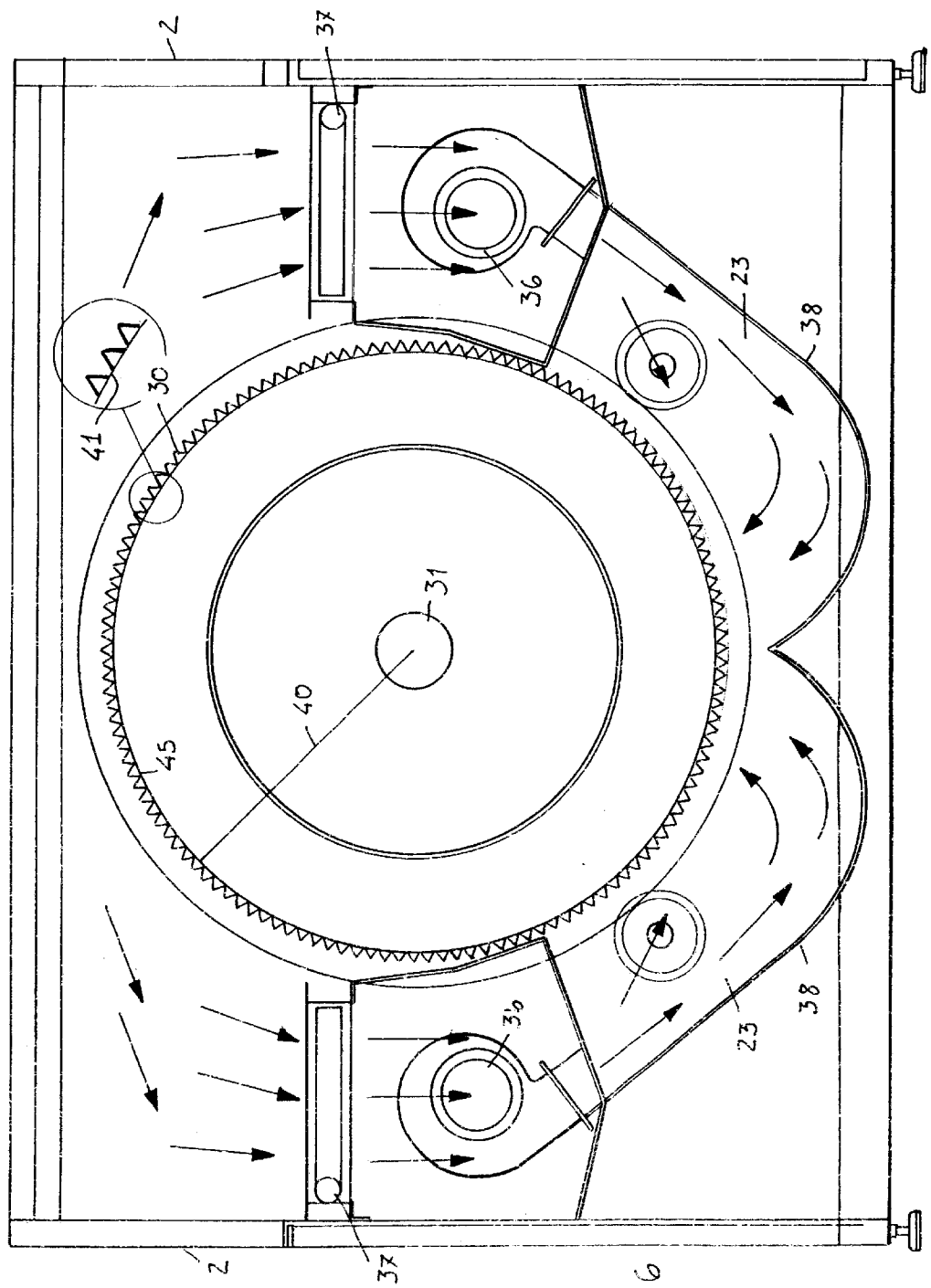
FIG. 6 is a further cross-sectioned side view of the modified embodiment shown in FIG. 5, being cross-sectioned according to a cross plane perpendicular to the longitudinal axis of the system.

FIGS. 5 and 6 of the accompanying drawings show a modified embodiment of the continuously drying apparatus according to the present invention, which modified embodiment has been specifically designed for unpackaged food products and vegetables according to the invention.

This modified embodiment relates, in particular, to the unpackaged food product feeding device, for feeding unpackaged food products and vegetables to be continuously dried, by using the subject apparatus.

The latter, in the modified embodiment shown in FIGS. 5 and 6, provides to replace the conveyor belts 4 by a rotary cylinder 30, including a supporting shaft 31 and designed for turning on suitable bearings and supporting elements 42.

Said rotary cylinder 30 is provided, on the peripheral portion thereof, and depending on the product to be dried, either with a perforated sheet metal element or a plurality of triangular cross-section tubular elements 45, a slot 41 being provided between each pair of said tubular elements, with respective fins 45 tending to narrow said slots 41, as: formed through the circular peripheral walls of said rotary cylinder 30.

Thus, it is possible to increase the speed of the air flow being conveyed inside said cylinder 30, by using fan batteries 36, said fans conveying the drying air through suitable thermal exchange batteries or assemblies 37, defining a condensation region 23.

By the above mentioned fans 36, the air, upon conveying toward the thermal exchange battery 7 and upon condensing the moisture thereof at the condensation region 23, is conveyed, by curved walls 38, toward the undulated surface of the rotary cylinder 30, holding therein a conveyor screw 40, rigid with said rotary cylinder 30.

Said conveyor screw 40, by turning rigidly with said drum, causes the unpackaged vegetable or food products to be introduced into the subject apparatus through a side opening 32 because of the rotary movement of the cylinder 30 and the conveying screw 40 held therein, to be fed along the slanted walls of the conveying screw 40, to respectively fall into the loop elements 34 formed because of the rotary movement of the conveying screw 40.

Actually, the latter, as it is rotatively driven, causes the unpackaged food products or vegetables to be progressively advanced toward the unloading opening or mouth 33.

By the disclosed feeding and mixing movement of the unpackaged vegetable and food products contacting the walls of the conveying screw 40, said products are dried by the air conveyed by the above mentioned electrofans 36.

The air flow, after having passed through the thermal exchange batteries or assemblies 37, will be conveyed through the slots 41 formed at the slanted fin pairs 45, which tend to narrow from the outside toward the inside of the rotary cylinder 30.

Thus, because of the specifically designed walls of the rotary cylinder 30 and under a Venturi effect, the air will enter said cylinder 30 with a high speed, while efficiently processing the vegetables or food products to be dried.

FIG. 5 shows a plurality of fans 36 included in said tunnel 3.

With respect to the overall operation of the modified embodiment of the system shown in FIGS. 5 and 6, this operation, with exception of the feeding device, is the same as that of the constructional embodiments shown in FIGS. 1, 2, 3 and 4 constituting an integrating part of the present invention.

It has been found that the invention, as disclosed, fully achieves the intended aim and objects.

Actually, the subject apparatus provides a continuous drying of unpackaged food products and vegetables, and is adapted to dry said products by using a dry air having a comparatively low temperature, much lower than that of prior systems.

Thus, it is possible to dry the vegetable products, with a low temperature air, without damaging the product and negatively affecting its organoleptic characteristics.

The apparatus according to the invention is susceptible to several modifications and variations, all of which will come within the scope of the invention.

Moreover, all of the constructional details can be replaced by other technically equivalent elements.

In practicing the invention, the used materials, as well as the contingent size and shapes, can be any, depending on requirements and the status of the art.

What is claimed is:

1. An apparatus for continuously drying unpackaged food products and vegetables, comprising conveyor means for conveying food products to be dried and air circulating means for conveying dry air on the food products to be dried and collecting moist air from said food products, dehumidifying means for dehumidifying moist air, said dehumidifying means comprising an adsorption dehumidifying device of a rotary type, including a rotary drum holding a hygroscopic material and adapted to receive moist air from an air inlet and to send a dehumidified air to a delivery outlet, and a regenerating device for regenerating said hygroscopic material, comprising an environment air inlet, a heater and a moist air outlet, a box shaped body defining a tunnel for conveying said food products on said conveyor means and a channel forming said drying air circulating means, wherein said tunnel defines a condensation region comprising a plurality of fans and a thermal exchange battery, either of a steam, hot water or other heater element type.

2. An apparatus according to claim 1, wherein said channel defines a first, second and third regions, at said first region said channel being coupled to a moist air ejecting opening for ejecting moist air from said tunnel, said first region comprising an air inlet, controlled by a gate, for taking environment air, and fan means and a first cooling battery.

3. An apparatus according to claim 2, said second region of said channel comprising an adsorption air dehumidifying device and wherein said third region of said channel comprises a second cooling battery and an air inlet opening, arranged on near a food product of said tunnel.

4. An apparatus according to claim 1, wherein said apparatus further comprises a rotary cylinder including a support shaft designed for turning on bearings, said rotary cylinder having circular peripheral walls defining an inside and an outside of the cylinder said walls supporting a plurality of fins, formed by V-shape elements.

5. An apparatus according to claim 4, wherein between each pair of said fins a slot is provided, said fins tending to narrow a width of said slots formed through said circular peripheral walls of said rotary cylinder.

6. An apparatus according to claim 4, wherein said rotary cylinder is provided, through said circular peripheral walls thereof, with a plurality of slots formed at inclined fin pairs, tending to narrow from the outside toward the inside of said rotary cylinder.

\* \* \* \* \*